(12) United States Patent
Wen et al.

(10) Patent No.: US 8,821,953 B2
(45) Date of Patent: Sep. 2, 2014

(54) METHOD AND APPARATUS FOR DECOCTING INGREDIENTS IN A SOLVENT

(75) Inventors: Tao Wen, Shanghai (CN); Gang Wang, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 13/995,696

(22) PCT Filed: Dec. 20, 2011

(86) PCT No.: PCT/IB2011/055804
§ 371 (c)(1),
(2), (4) Date: Jun. 19, 2013

(87) PCT Pub. No.: WO2012/090119
PCT Pub. Date: Jul. 5, 2012

(65) Prior Publication Data
US 2013/0287915 A1 Oct. 31, 2013

(30) Foreign Application Priority Data
Dec. 29, 2010 (CN) ................. PCT/CN2010/002189

(51) Int. Cl.
*A47J 31/46* (2006.01)

(52) U.S. Cl.
USPC ............. 426/425; 426/77; 426/433; 426/435; 99/318; 99/289 D; 99/284; 99/322; 99/303

(58) Field of Classification Search
USPC .......... 426/425, 77, 433, 435; 99/318, 289 D, 99/284, 322
See application file for complete search history.

(56) References Cited

U.S. PATENT DOCUMENTS

| 2,104,017 | A | | 1/1938 | Bradshaw et Al |
| 4,591,094 | A | * | 5/1986 | Morris ............................ 239/17 |
| 5,127,366 | A | * | 7/1992 | Kim ................................ 119/246 |
| 7,779,751 | B2 | * | 8/2010 | Gilbert ............................ 99/318 |
| 2005/0120886 | A1 | * | 6/2005 | Chen ................................ 99/279 |
| 2009/0178569 | A1 | * | 7/2009 | Tucker et al. .................. 99/282 |
| 2009/0246341 | A1 | | 10/2009 | Pitner et al. |

FOREIGN PATENT DOCUMENTS

| CN | 2104017 U | 5/1992 |
| CN | 2582600 Y | 1/2003 |
| GB | 2464806 A | 5/2010 |
| JP | 11103777 | 4/1999 |

* cited by examiner

*Primary Examiner* — Anthony Weier

(57) ABSTRACT

A method and an apparatus for decocting ingredients in a solvent. The apparatus including a container for containing the solvent, a recipient for containing the ingredients, the recipient being placed inside the container, a pipe connecting a bottom part of the container and a bottom part of the recipient, a pump placed in series with the pipe for circulating the solvent from the bottom part of the container to the bottom part of the recipient.

6 Claims, 3 Drawing Sheets

METHOD AND APPARATUS FOR DECOCTING INGREDIENTS IN A SOLVENT

FIELD OF THE INVENTION

The invention relates to a method and an apparatus for decocting ingredients in a solvent.

The invention may be used in the field of drink or beverage preparation.

BACKGROUND OF THE INVENTION

Preparing beverages by means of decocting ingredients in a solvent is often used for preparing various drinks or traditional Chinese medicine beverages. For example, preparations of traditional Chinese medicine are made by decocting herbs/plants used as (raw) ingredients in hot/boiling water used as solvent until solids/compounds (i.e. active nutrients) contained in the ingredients are extracted/diffused in the solvent. After a given period of time, ingredients are taken out of the solvent, and the resulting beverage is ready for drinking. Traditionally, this process comprises the following steps:

- Preparing the ingredients: pre-sizing (e.g. slicing and grinding), cleaning the ingredients. The ingredients could also be in powder form.
- Soaking: putting the ingredients into cold water for a certain time. The purpose of this step is to get water to enter into the cell structure of ingredients so as to later facilitate compound-extraction in the solvent.
- Decocting: putting ingredients in a recipient with boiling water, so that compounds are extracted from the ingredients in the water.
- Filtering: separating the ingredients from the solvent so that users can consume a clean drink without residues.

However, such a process is not convenient for a user, because it requires a lot of successive steps, and also because the extraction can take up to a few hours; in other words it takes a very long time before the beverage is ready for consumption. To speed-up the process, a user may be tempted to shorten the time of decocting, but in that case nutrients might not all be extracted from the ingredients, resulting in a beverage which is not optimal as regards the solids/compounds contained in it, thus affecting the taste or the efficiency on user health.

OBJECT AND SUMMARY OF THE INVENTION

It is an object of the invention to propose an improved method and apparatus for decocting ingredients in a solvent. The invention is defined by the independent claims. The dependent claims define advantageous embodiments.

To this end, the apparatus according to the invention comprises:

- a container for containing the solvent,
- a recipient for containing the ingredients, said recipient being placed inside said container,
- a pipe connecting a bottom part of the container and a bottom part of said recipient,
- a pump placed in series with said pipe for circulating the solvent from said bottom part of the container to said bottom part of the recipient.

Compared to the known decoction process, where the solvent is static in the recipient and tends to become quickly saturated around the ingredients, causing a slow extraction of compounds contained in the ingredients, the apparatus according to the invention allows, by creating a circulation of solvent in between the ingredients, continuous replacement of the solvent being present around the ingredients and having a high concentration of extracted compounds (i.e. saturated), by fresh solvent having a lower concentration of compounds. It thus allows accelerating the extraction of the compounds in the ingredients, and hence reduces the total time of beverage preparation. Also, with such an apparatus, soaking ingredients is not necessary anymore, because the extraction of compounds is already optimal thanks to the dynamic circulation of solvent in between the ingredients.

The invention also relates to a method comprising various steps carried out by an apparatus according to the invention.

Detailed explanations and other aspects of the invention will be given below.

BRIEF DESCRIPTION OF THE DRAWINGS

The particular aspects of the invention will now be explained with reference to the embodiments described hereinafter and considered in connection with the accompanying drawings, in which identical elements are designated in the same manner.

DETAILED DESCRIPTION OF THE INVENTION

Figure 1:
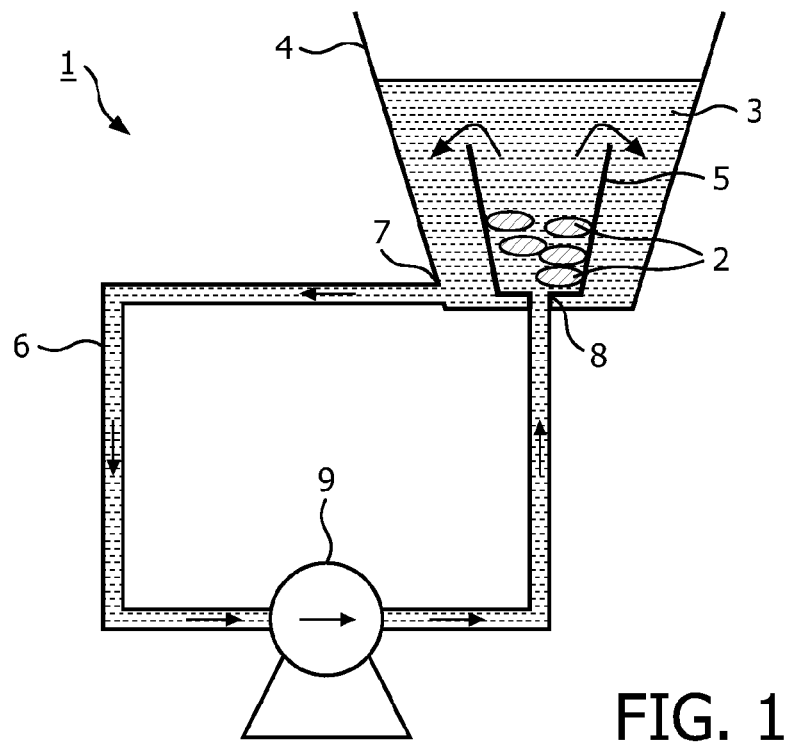
FIG. 1 depicts a first embodiment of an apparatus according to the invention for decocting ingredients in a solvent.

FIG. 1 depicts a first embodiment of an apparatus 1 according to the invention for decocting ingredients 2 in a solvent 3. The apparatus comprises:

- a container 4 for containing the solvent,
- a recipient 5 for containing the ingredients, said recipient being placed inside said container,
- a pipe 6 connecting a bottom part 7 of the container and a bottom part 8 of said recipient,
- a pump 9 placed in series with said pipe for circulating the solvent from said bottom part of the container to said bottom part of the recipient.

Ingredients may correspond to, for example, tea leaves, plants, leaves, coffee beans, herbs, vegetable roots, fruits, or a mix of those ingredients. The solvent may correspond to, for example, water, mineral water, tap water, salted water, alcohol, or a mix of those solvents.

The container 4 is a tank into which the solvent 3 is to be poured by a user at the start of the decocting process. For sake of illustration, the solvent is represented by a plurality of short dotted lines.

The recipient 5 also takes the form of a tank, yet of smaller size, and is placed directly inside the container 4 at bottom part 8 thereof. Advantageously, recipient 5 does not contact the bottom part of the container, but is in a slightly elevated position, as illustrated in FIG. 1, to facilitate the circulation of the solvent inside the container 4. Advantageously, the walls of the recipient are such that, together with the walls of the container, an empty space is created which allows solvent to freely circulate in between the walls. For example, the walls of the recipient can have the same shape as those of the container and may be more or less parallel thereto.

The pipe 6 is placed outside the container 4. A first part of the pipe 6 exits from the bottom part 7 of the container, and connects to the input of pump 9. A second part of the pipe 6 exits from the output of pump 9, and connects to a bottom part 8 of said recipient 5. For example, a pipe made of a material such as plastic or glass can be used. The pump 9 is used to pump the solvent from the container 4 into recipient 5. Any types of pump can be used, and may for example correspond to an electrical water pump. The flow rate of the pump can be set at different values, depending on the volume of the solvent used. For example, if the volume of solvent (water) is one litter, the flow rate of the pump can be set between one and two litters per minute. Preferably, the higher the volume of solvent, the higher the flow rate is.

The pump is intended to create a circulation of solvent between the container and the recipient, the direction of the solvent circulation being illustrated in FIG. 1 by means of arrows inside the pipe. When the solvent enters the recipient 5, it passes through ingredients 2, which facilitates extraction of compounds contained in those ingredients. Then, the solvent exits at a top part of the recipient and is mixed with fresh solvent already present in the container, i.e. mixed with solvent having a lower concentration of compounds. Then, solvent in the container exits via the first part of the pipe 6. The circulation of the solvent thus forms a closed cycle which is continued for a given time duration until it is decided, for example via dosing compounds in the solvent or tasting the solvent, that most compounds have been extracted from the ingredients. It is noted that this time duration may vary, depending on which ingredients are used, but it is not an object of the invention to elaborate further on this aspect.

Preferably, the volume of the container is much larger than the volume of the recipient, for example 5 times larger, to make sure that the solvent having a high concentration of compounds flowing out of the recipient can be diluted by the larger volume of solvent in the container having a lower concentration of compounds.

Figure 2:
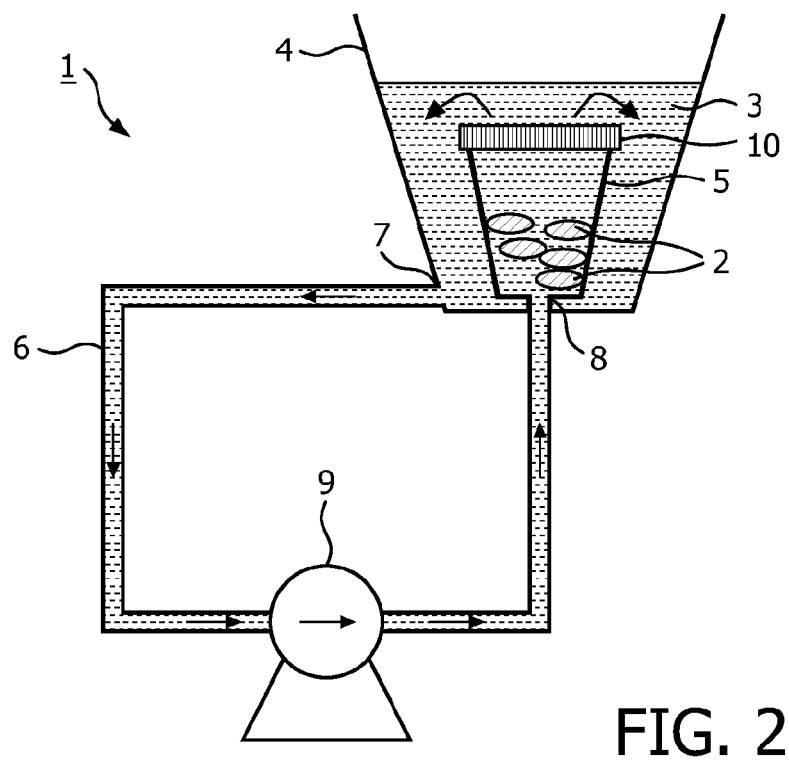
FIG. 2 depicts a second embodiment of an apparatus according to the invention for decocting ingredients in a solvent.

FIG. 2 depicts a second embodiment of an apparatus 1 according to the invention for decocting ingredients 2 in a solvent 3. In addition to elements comprised in an apparatus as shown in FIG. 1, this apparatus comprises a filter 10 placed at the top of said recipient, in a way similar to a lid. When the solvent enters recipient 5, the circulation of the solvent may push ingredients upwards, causing them to enter into and be dispersed in container 4, in particular if the flow rate is rather important in view of the mass of the ingredients. This filter is thus intended to ensure that ingredients cannot leave the recipient 5. Using this filter is particularly advantageous if ingredients are very light, or have a lower density than the solvent, as a result of which they naturally float upwards. Thanks to this filter, ingredients are kept confined in the recipient. For example, a filter made of plastic or metal and forming a mesh or net structure can be used. The filter can be sealed or attached to the recipient after ingredients have been introduced into the recipient by a user before the start of the decoction process.

Figure 3:
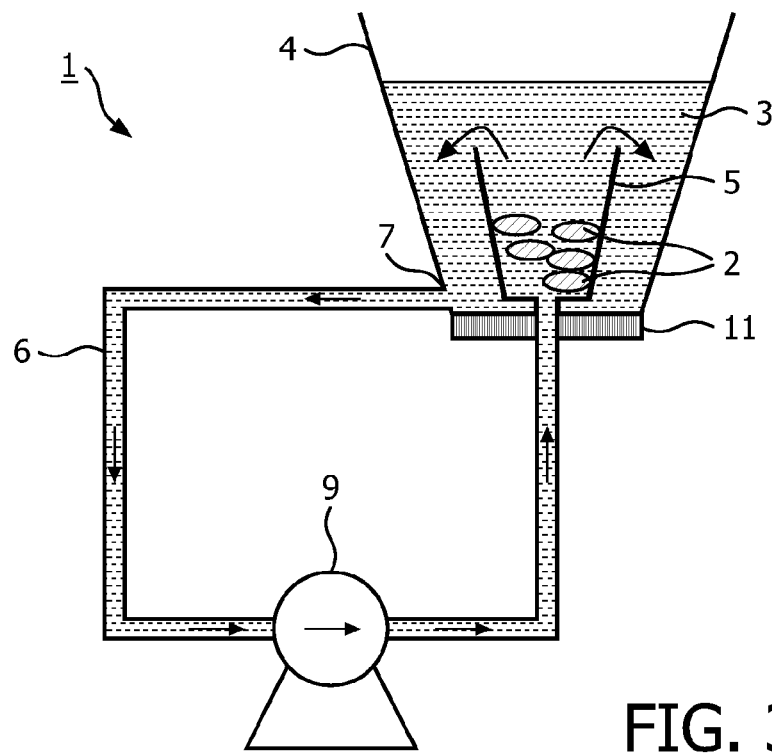
FIG. 3 depicts a third embodiment of an apparatus according to the invention for decocting ingredients in a solvent.

FIG. 3 depicts a third embodiment of an apparatus 1 according to the invention for decocting ingredients 2 in a solvent 3. In addition to elements comprised in an apparatus as shown in FIG. 1, this apparatus comprises a heating system 11 placed adjacent to said container for heating the solvent. The heating system can be placed in the base of the container, as illustrated, or along the walls of the container (not shown). The heating system can advantageously correspond to a resistor supplied by electric current. The heating system is intended to heat the solvent in the container, so that heated solvent circulates in between ingredients in the recipient.

Figure 4:
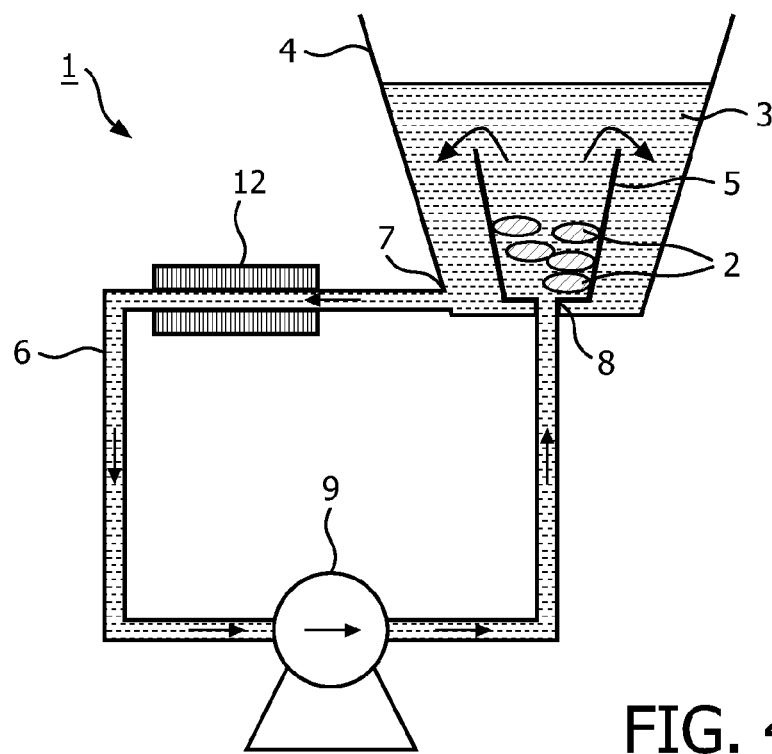
FIG. 4 depicts a fourth embodiment of an apparatus according to the invention for decocting ingredients in a solvent.

FIG. 4 depicts a fourth embodiment of an apparatus 1 according to the invention for decocting ingredients 2 in a solvent 3. In addition to elements comprised in an apparatus as shown in FIG. 1, this apparatus comprises a heating system 11 placed adjacent to the pipe 6 for heating the solvent. The heating system can be placed along a portion of the pipe. The heating system can advantageously correspond to a resistor supplied by electric current. The heating system is intended to heat the solvent in the container, so that heated solvent circulates in between ingredients in the recipient.

Figure 5:
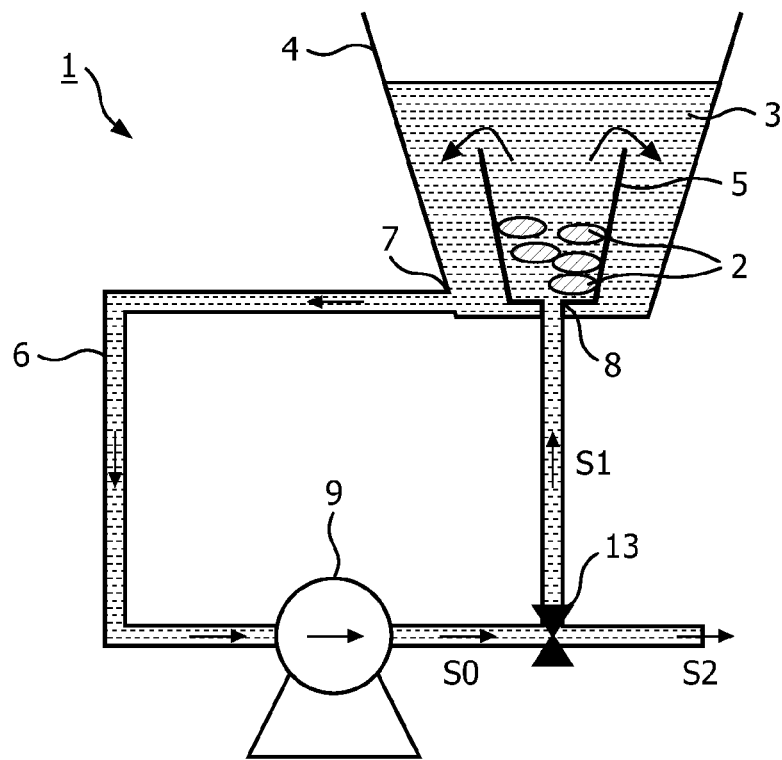
FIG. 5 depicts a fifth embodiment of an apparatus according to the invention for decocting ingredients in a solvent.

FIG. 5 depicts a fifth embodiment of an apparatus 1 according to the invention for decocting ingredients 2 in a solvent 3. In addition to elements comprised in an apparatus as shown in FIG. 1, this apparatus comprises a valve 13 placed in series with the pipe 6. The said valve is adapted to take a first position for circulating the solvent from said bottom part of the container to said bottom part of the recipient, and to take a second position for draining the solvent from the container. In the first position, the valve connects section S0 of the pipe to section S1 of the pipe, which corresponds to the position during decoction of ingredients. In the second position, the valve connects section S0 of the pipe to an outside section S2 of the pipe, which corresponds to the position during draining the container. When the decoction process is finished, the solvent in the container corresponds to the drink/beverage comprising compounds extracted from the ingredients. Positioning the valve in the second position, thus allows removing the solvent from container 4, for example pouring the solvent into another recipient, such as a glass (not shown). The valve can be a valve manually activated by a user, or an electrovalve activated by a system (not shown) when the time duration of the decoction process has ended. It is noted that instead of using valve 13, a tap directly connected to a bottom part of container 4 could be used, for example a tap which is manually activated by a user.

Figure 6:
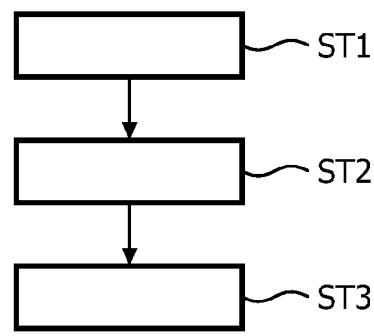
FIG. 6 depicts a method according to the invention of decocting ingredients in a solvent.

FIG. 6 depicts a method according to the invention of decocting ingredients in a solvent. This method comprises the steps of:

circulating ST1 the solvent from a bottom part of a container containing the solvent, for example a container 4 as depicted in FIG. 1 to FIG. 5, to a bottom part of a recipient containing the ingredients, for example a recipient 5 as depicted in FIG. 1 to FIG. 5, circulating ST2 the solvent from said bottom part of the recipient to a top part of the recipient, circulating ST3 the solvent from said top part of the recipient to said bottom part of the container.

This method comprises the various steps carried out by an apparatus according to the invention as depicted in FIG. 1 to FIG. 5.

While the invention has been illustrated and described in detail in the drawings and foregoing description, such illustration and description are to be considered illustrative or exemplary, and not restrictive; the invention is not limited to the disclosed embodiments. For example, the shape of the container and the recipient could be different, while they both continue to have the same function. Although additional features of apparatus depicted in FIG. 2, FIG. 3, FIG. 4, FIG. 5 have been presented separately, based on an apparatus as depicted in FIG. 1, those features could also be combined together in an apparatus as depicted in FIG. 1. In the claims, the word "comprising" does not exclude other elements or steps, and the indefinite article "a" or "an" does not exclude a plurality. Any reference signs in the claims should not be construed as limiting the scope of the invention.

The invention claimed is:

1. Apparatus for decocting ingredients in a solvent, the apparatus comprising:
   a container for containing the solvent,
   a recipient having a wall for containing the ingredients and having an outside surface defining an exterior of the recipient, the recipient being placed inside the container,
   a pipe connecting a bottom part of the container and a bottom part of the recipient,
   a pump placed in series with the pipe for circulating the solvent from the bottom part of the container to the bottom part of the recipient, from the bottom part of the recipient to a top part of the recipient, from the top part of the recipient over the wall along the exterior of the recipient to the bottom part of the container.

2. The apparatus as claimed in claim 1, further comprising a filter placed at a top part of the recipient.

3. The apparatus as claimed in claim 1, further comprising a heating system placed adjacent to the container, for heating the solvent.

4. The apparatus as claimed in claim 1, further comprising a heating system placed adjacent to the pipe, for heating the solvent.

5. Apparatus for decocting ingredients in a solvent, the apparatus comprising:
   a container for containing the solvent,
   a recipient having a wall for containing the ingredients, the recipient being placed inside the container,
   a pipe connecting a bottom part of the container and a bottom part of the recipient,
   a pump placed in series with the pipe for circulating the solvent from the bottom part of the container to the bottom part of the recipient, from the bottom part of the recipient to a top part of the recipient, from the top part of the recipient over the wall to the bottom part of the container, and
   a valve placed in series with the pipe, the valve being adapted to take a first position for circulating the solvent from the bottom part of the container to the bottom part of the recipient, and to take a second position for draining the solvent from the container.

6. Method of decocting ingredients in a solvent, the ingredients being contained in a recipient having a wall placed inside a container containing the solvent, the method comprising acts of:
   circulating the solvent from a bottom part of the container to a bottom part of the recipient,
   circulating the solvent from the bottom part of the recipient to a top part of the recipient,
   circulating the solvent from the top part of the recipient over the wall to the bottom part of the container.

* * * * *